7275X
D. Hinman,
Making Axes, Hatchets, Chisels, &c.
Patented Nov. 2, 1832.
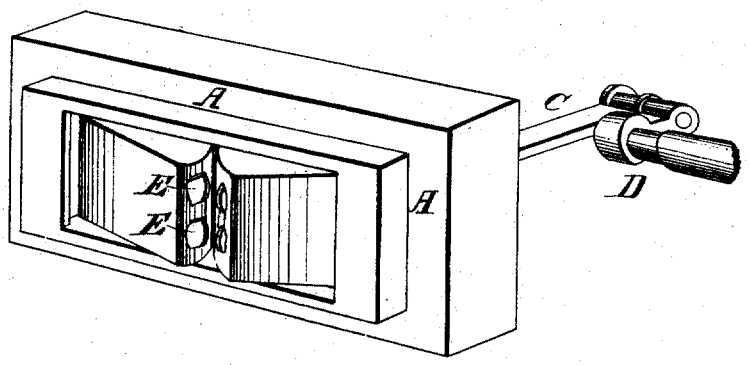
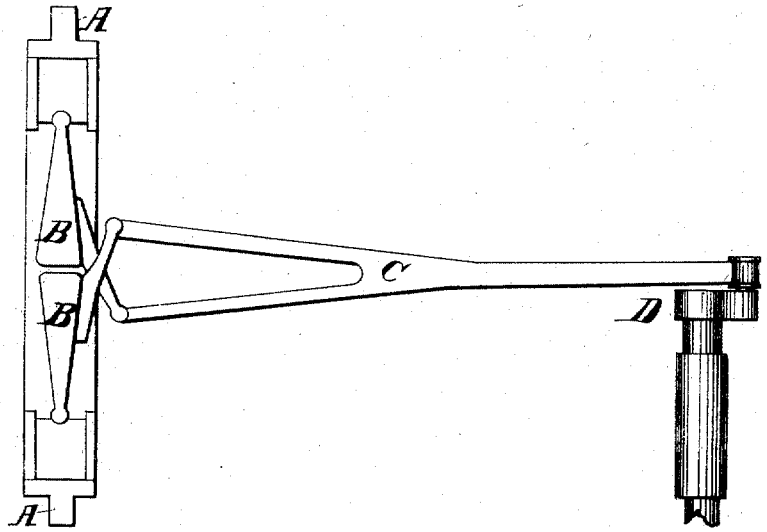
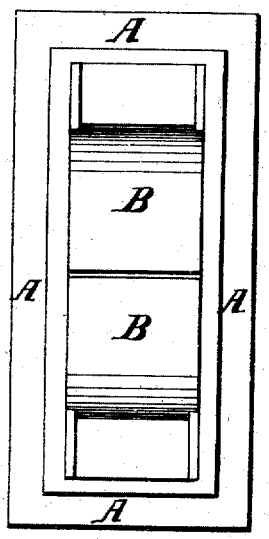

David Hinman of Winchester Co. of Litchfield. Connecticut.

The Schedule referred to in these Letters Patent and making a part of the same, containing a description in the words of the said David Hinman himself of his improvement in the machine for making Axes, Hatchets Chisels &c.

---

To all to whom these presents shall come:

Be it known that I David Hinman of Winchester County of Litchfield & State of Connecticut, have invented a new & useful machine for making axes, Hatchets, Chisels & other tools, of iron & Steel & other work in the same metals, & that the following is a full & exact description of the construction & operation of the said machine as invented by me. The machine is constructed in the following manner.

An iron frame is constructed of an oblong form of suitable dimensions & of sufficient strength, to contain the folding arms & to sustain the requisite pressure when the work is applied. Within this frame so constructed as above described, two arms are made stationary, at the two ends so as to vibrate at the center thro' the frame, these arms are to be of suitable dimensions for fastening at their moving ends, the dies by which the work is to be formed. The above described arms, are vibrated by means of pitmans connecting the moving ends of these arms with a crank, the arms are to be vibrated in one direction so as at the extreme point of vibration to open, & receive between the dies, the metal which is to be forged, or sweaged, to the shape of said dies & on receiving said metal to give it the desired form, by the return motion bringing said dies sufficiently near together at the central point of vibration or at the point where said arms are brought to the same straight line. The principle & object of this machine is to effect the work usually done by hammering or swedging in the ordinary methods by applying the work between the moving ends of the two arms, or mechanical power called the fold as described above.

The discovery claimed to have been made by this application of power -

502 X7275 is, the more easily forging or swedging the metal to the desired shape
by means of the motion acquired between the vibrating ends of the
two arms, than by any application of power giving to the metal a
squeeze or pressure in one direction only.

That the above described discovery was made by me
the said David Hinman as early as 10th Oct. 1821

Witness

Exd. Adaline Malabud }
W.H. Wm. S. Malabud }

David Hinman (450 [illegible]) Patented November 2d. 1832.